(12) United States Patent
Jin

(10) Patent No.: US 6,845,443 B2
(45) Date of Patent: Jan. 18, 2005

(54) METHOD OF PROCESSING A REPEAT BLOCK EFFICIENTLY IN A PROCESSOR WHEREIN THE REPEAT COUNT IS NOT DECREMENTED IN A SPECIFIC CASE TO PREVENT ERROR IN EXECUTION

(75) Inventor: Seong Ae Jin, Seoul (KR)

(73) Assignee: Hynix Semiconductor Inc, Kyoungki-do (KR)

( * ) Notice: Subject to any disclaimer, the term of this patent is extended or adjusted under 35 U.S.C. 154(b) by 638 days.

(21) Appl. No.: 09/750,115

(22) Filed: Dec. 29, 2000

(65) Prior Publication Data

US 2001/0007126 A1 Jul. 5, 2001

(30) Foreign Application Priority Data

Dec. 30, 1999 (KR) .......................................... 99-066242

(51) Int. Cl.$^7$ ................................................ G06F 9/40
(52) U.S. Cl. ...................................... 712/241; 712/244
(58) Field of Search .................................. 712/241, 244

(56) References Cited

U.S. PATENT DOCUMENTS

| 5,535,348 A | 7/1996 | Leach et al. ................. 395/375 |
| 5,960,210 A | * 9/1999 | Jin ................................. 712/1 |

* cited by examiner

Primary Examiner—Eddie Chan
Assistant Examiner—Amol Gole
(74) Attorney, Agent, or Firm—Jacobson Holman PLLC

(57) ABSTRACT

The invention presents a method for processing data in a processor having a processor core for processing a command in a pipeline form. The method comprises the steps of setting a repeat count value; executing a repeat block command to set a repeat ending address and a repeat starting address; comparing the repeat ending address and a memory address of the second command to identify whether they are identical to each other; checking whether the first command is a command for nonlinearly changing an executing order of a program if the repeat ending address and the memory address of the second command are identical to each other; and storing the memory address of the second command while not reducing the repeat count value if the first command is a command for nonlinearly changing the executing order of the program.

5 Claims, 4 Drawing Sheets

F = FETCH
D = DECODE
R/E = READ/EXECUTE

METHOD OF PROCESSING A REPEAT BLOCK EFFICIENTLY IN A PROCESSOR WHEREIN THE REPEAT COUNT IS NOT DECREMENTED IN A SPECIFIC CASE TO PREVENT ERROR IN EXECUTION

BACKGROUND OF THE INVENTION

1. Field of the Invention

The present invention relates to a processor, and more particularly, to a method for processing data in a processor which is capable of efficiently executing a program including a repeat block (referred to as RPTB, hereinafter).

2. Description of the Background Art

FIG. 1 is a block diagram of a processor for performing a program including the RPTB command in accordance with conventional art.

As shown in the drawing, a processor core 100 includes an operation logic and a partial control logic and processes a command stored in a program memory 101 in a pipeline form, that is, in three steps of fetch (F)—decode (D)—read/execute (R/E). The memory 101, a general term in use for a processor, stores a command to be decoded by the processor core 100. A program counter generation logic 106 generates a program counter (PC) value under the control of the processor core 100, and the generated PC value is stored in a program counter 108 through a multiplexer 107. The PC value is the memory address to be fetched during an operational cycle of a processor.

A RPTB control logic 102, a repeat count (RC) register 103, a repeat ending register 104, and a repeat starting register 105 for the repeat block (RPTB) logic. The RPTB control logic 102 is operated by an enable signal outputted from the processor core 100, and when it carries out a RPTB command, it controls the repeat counter (RC) register 103, the repeat ending (RE) register 104, the repeat starting (RS) register 105 and the multiplexer (MUX) 107.

The repeat counter (RC) register 103 stores a repeat count value (repeating number) (BRC), and the repeat ending (RE) register 104 and the repeat starting (RS) register 105 store a repeat ending address (REA) and a repeat starting address (RSA), respectively.

The RPTB control logic 102 compares a memory address stored in the program counter 108 with the repeat ending address (REA), and if the two addresses are the same, the RPTB control logic 102 controls the multiplexer 107 so that the repeat starting address (RS) stored in the RS register 105 is inputted to the program counter 108 and a reduction signal is outputted to the RC register 103 to reduce the repeat count value (BRC).

The operation of the processor in accordance with the conventional art, as described above, will now be explained in the process of executing <Program 1> below.

The repeat count value (BRC) is set to '1' and the repeat ending address (REA) of the RPTB command is set to 'n+3'. The repeat block includes three commands "CALL", "ADD" and "SUB".

| <Program 1> | | | |
|---|---|---|---|
| STM | BRC | #2 | n − 1 |
| RPTB | n + 3 | | n |

| <Program 1> | |
|---|---|
| CALL | n + 10 | n + 1 |
| ADD | | n + 2 |
| SUB | | n + 3 |
| RET | | n + 10 |
| NOP | | n + 11 |
| NOP | | |

FIG. 3 is an exemplary view showing how each command of <Program 1> is processed in the pipeline.

In the first cycle 60, the processor core 100 fetches a command "STM" corresponding to a memory address (n−1) outputted from the program counter 108 from the memory 101.

In the second cycle 61, the processor core 100 decodes the fetched command "STM" and outputs a control signal for storing the repeat count value (BRC) '2' to the RPTB control logic 102. The processor core 100 controls the PC generation logic 106 so that the present PC value (n) is increased to be the next PC value (n+1), and fetches the command "RPTB" corresponding to memory address (n) of the program counter 108 from the memory 101.

In the third cycle 62, the RPTB control logic 102 sets repeat count values (BRC) of '2' in the RC register 103. The processor core 100 decodes the fetched "RPTB" command to output an enable signal and a repeat ending address (REA) to the RPTB control logic 102, and controls the PC generation logic 106 so that the current value is increased to be the next PC value (n+2). Also, the processor core 100 fetches a command "CALL" corresponding to the memory address (n+1) of the program counter 108 from the memory 101.

In the fourth cycle 63, the RPTB control logic 102 is enabled by the execution of the "RPTB" command to set the repeat ending address (REA) of (n+3) in the RE register 104 and to set the memory address (n+2) outputted from the program counter 108 as a repeat starting address (RSA) in the RS register 105. That is, the RPTB control logic 102 sets the address (n+3) of the executed RPTB command as the repeat ending address (REA) and the memory address (n+2) of the program counter 108 as a repeat starting address (RSA).

After the processor core 100 decodes the command "CALL", the processor core controls the memory 101 so as to store the memory address (n+2) outputted from the program counter 108, and controls the PC generation logic 106 so as to generate the next PC value (n+10). At this time, since the repeat ending address (REA) (n+3) is different from the memory address (n+2) of the program counter 108, the RPTB control logic 102 does not perform any controlling operation. The processor core 100 also fetches the command "ADD" corresponding to the memory address (n+2).

In the fifth cycle 64, the memory 101 stores the memory address (n+2). The processor core 100 does not decode the fetched command "ADD" since the previous command was "CALL", and controls the PC generation logic 106 so that the present PC value will be increased to be (n+11). And, the processor core 100 fetches a command "RET" corresponding to the memory address (n+10).

In the sixth cycle 65, since the command "ADD" was not decoded, the processor core 100 does not execute the command "ADD". The processor core 100 decodes the fetched command "RET". Since the command "RET" signifies a return, the processor core 100 reads out the memory address (n+2) previously stored in the memory 101 and controls the PC generation logic 106 so that the memory address (n+2) will be set again as a PC value. And, the processor core 100 fetches a command "NOP" corresponding to memory address (n+11).

In the seventh cycle 66, since returning operation is being performed, the processor core 100 executes nothing. The processor core 100 decodes the fetched command "NOP", and controls the PC generation logic 106 so that the present PC value (n+2) will be increased to (n+3). And, the processor core 100 fetches the command "ADD" corresponding to memory address (n+2) from the memory 101.

In the eighth cycle 67, since the command "NOP" is 'No operation', the processor core 100 executes nothing. And, the processor core 100 decodes the fetched command "ADD" and controls the PC generation logic so as to generate the next PC value (n+4). Since the present PC value (n+3) is identical to the repeat ending address (REA)(n+3) of the RE register 104, the RPTB control logic 102 controls the RS register 105 and the multiplexer 107 so that the repeat starting address (RSA) of (n+1) is inputted to the program counter 108. And, the RPTB control logic 102 outputs a reduction signal to the RC register 103. And the processor core 100 fetches a command "SUB" corresponding to the memory address (n+3) from the memory 101.

In the ninth cycle 68, the processor core 100 executes the command "ADD", and the RC register 103 reduces the repeat count value (BRC) from '2' to '1' in accordance to the reduction signal. And, the processor core 100 decodes the command "SUB" and fetches the command "CALL" from the memory address (n+1).

Thereafter, the operations from the fourth cycle 63 to the eighth cycle 67 are repeated, and when the PC value (n+3) is identical to the repeat ending address (REA) again, the RPTB control logic 102 outputs a reduction signal to the RC register 103. Then, the RC register 103 reduces the repeat count value (BRC) to '0' according to the reduction signal, and when the repeat count value (BRC) of the RC register 103 becomes '0', the processor core 100 disables the RPTB control logic 102.

In addition, the data process operation of the conventional process will described in executing <Program 2> below.

<Program 2>

| STM | BRC | #2 | n − 1 |
|---|---|---|---|
| RPTB | n + 2 | | n |
| CALL | n + 10 | | n + 1 |
| ADD | | | n + 2 |
| RET | | | n + 10 |
| NOP | | | n + 11 |

In <Program 2>, the repeat count value (BRC) is set as '2', the same as that of <Program 1>. Meanwhile, unlike <Program 1>, the repeat ending address (REA) is set by 'n+2' in <Program 2>, and the repeat block includes only the commands of "CALL" and "ADD". Thus, in the case of executing <Program 2>, the first cycle 70 through the third cycle 72 are the same as those of <Program 1>.

In the fourth cycle 73, the RPTB control logic 102 sets the repeat ending address (REA) as (n+2) and the repeat starting address (RSA) as (n+1). After decoding the fetched command "CALL", the processor core 100 controls the PC generation logic 106 so that the memory address (n+2) can be stored in the memory 101. Also, the processor core 100 controls the PC generation logic 106 so that (n+10) becomes the next PC value. At this time, since the present PC value (n+2) is identical to the repeat ending address (REA), the RPTB control logic 102 outputs a reduction signal to the RC register 103. And, the processor core 100 fetches the command "ADD" corresponding to the memory address (n+2).

Thereafter, in the fifth cycle 74, the memory 101 stores the memory address (n+2), and the RC register 103 reduces the repeat count value (BRC) from '2' to '1' according to the reduction signal. Since the previous command is "CALL", the processor core 100 does not decode the fetched command "ADD", and controls the PC generation logic 106 so that the present PC value (n+10) will be increased to (n+11). And, the processor core 100 fetches the command "RET" corresponding to the memory address (n+10).

In the sixth cycle 65, since the command "ADD" was not decoded, the processor core 100 does not execute the command "ADD". The processor core 100 decodes the fetched command "RET". Since the command "RET" signifies a return, the processor core 100 reads out the memory address (n+2) previously stored in the memory 101 and controls the PC generation logic 106 so that the memory address (n+2) will be set again as a PC value. And, the processor core 100 fetches a command "NOP" corresponding to memory address (n+11).

In the seventh cycle 76, since the returning operation is being performed, the processor core 100 executes nothing. The processor 100 decodes the fetched command "NOP" and fetches the command "ADD" corresponding to the memory address (n+2).

At this time, since the memory address (n+2) stored in the memory 101 is identical to the repeat ending address (REA), the RPTB control logic 102 outputs again the reduction signal to the RC register 103 and controls the RS register 105 and the multiplexer 107 so that the repeat starting address (RSA) of (n+1) will be the program counter value.

Accordingly, in the eighth cycle 77, the repeat count value (BRC) of the RC register 103 is reduced from '1' to '0', and at this time, the processor core 100 disables the RPTB control logic 102.

Here, it is noted that <Program 2> is executed differently from what was intended. That is, in <Program 2>, after "CALL", that is, the command of memory address (n+1) is decoded, the repeat count value (BRC) is reduced once but the "ADD" is not decoded or executed. Then after "CALL" is finished and the "RET" is executed, the repeat count value (BRC) is reduced again and the "ADD" is only executed once.

As a result of the "CALL", the "ADD" was actually executed once by the RPTB. The "ADD" was not executed as twice as designated by the repeat count register 103. Thus, the conventional processor has a problem in that at least three commands should be included in the RPTB to guarantee a reliability of the program.

Originally, the processor receives an unexpected input from external source as an interrupt, and upon receipt of it, the processor stores the current state (including an address), performs a specific program and returns to the previous state. This is quite similar to the "CALL" command. In a program including a repeat block consisting of more than three commands, if an interrupt comes in while the processor is executing the final portion (after a control signal is outputted to reduce the BRC) of the repeat block, the processor executes the interrupt and does not return to the previous state. The reason for this is that an execution was lost as a result of the interrupt. Accordingly, in the general processor of the conventional art, when the processor is interrupted while it is executing the final part of the repeat block, the program is not properly executed due to an inaccurate reduction of the repeat count value (BRC).

A possible solution to the problem would be that an interrupt is not to be applied while the final command of a repeat block is being executed. But forcibly blocking the interrupt to a command, which should be subordinate to the interrupt, would degrade efficiency of an application program.

SUMMARY OF THE INVENTION

Therefore, an object of the present invention is to provide a method for reliably executing a program with a repeat block, regardless of the number of commands included in the repeat block.

Another object of the present invention is to provide a method for processing data in a processor which is capable of preventing an inaccurate reduction of a repeat count value in executing a "CALL" command, thereby preventing an erroneous assumption that another command, which was not actually executed, is considered to have been executed.

To achieve these and other advantages and in accordance with the purpose of the present invention, as embodied and broadly described herein, there is provided a method for processing data in a processor having a processor core for processing a command in a pipeline form, a program counter for storing a memory address of a command to be fetched, decoded and executed by the processor core; a program counter generation logic for increasing a program counter value and outputting it to the program counter, and a memory for storing a program including a repeat block, comprising the steps of: setting a repeat count value; executing a repeat block command to set a repeat ending address and a repeat starting address, and decoding a first command of the repeat block and fetching a second command of the repeat block; comparing the repeat ending address and a memory address of the second command to identify whether they are identical to each other; checking whether the first command is a command for nonlinearly changing an executing order of a program if the repeat ending addresses and the memory address of the second command are identical to each other; and storing the memory address of the second command while not reducing the repeat count value if the first command is a command for nonlinearly changing the executing order of the program.

BRIEF DESCRIPTION OF THE DRAWINGS

The accompanying drawings, which are included to provide a further understanding of the invention and are incorporated in and constitute a part of this specification, illustrate an embodiment of the invention and together with illustrations that serve to explain the principles of the invention.

In the drawings.

DETAILED DESCRIPTION OF THE PREFERRED EMBODIMENTS

Reference will now be made in detail to the preferred embodiments of the present invention, an example of which is illustrated in the accompanying drawings.

Figure 5:
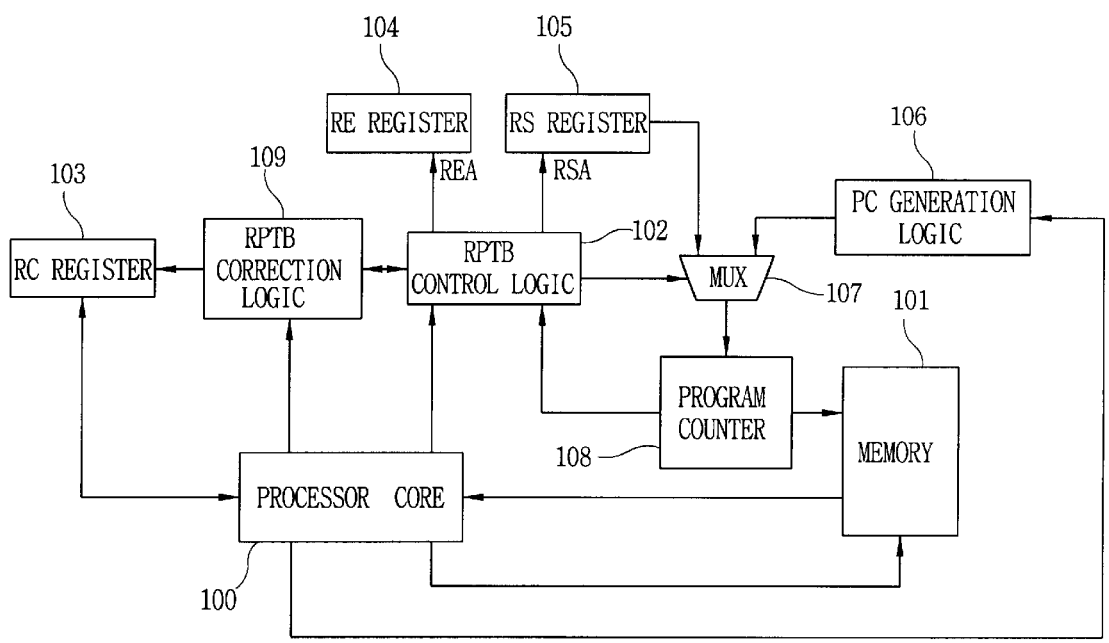
FIG. 5 is a block diagram of a processor for performing a program including a repeat block command in accordance with the present invention.

FIG. 5 is a block diagram of a processor for performing a program including a repeat block in accordance with the present invention.

Figure 1:
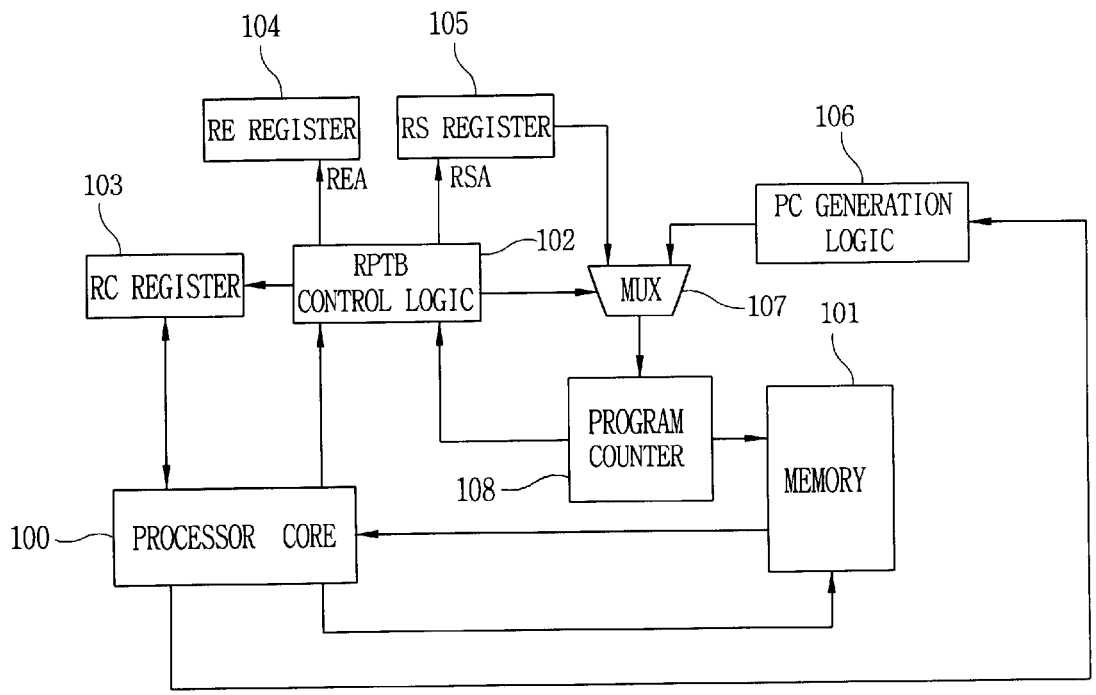
FIG. 1 is a block diagram of a processor for performing a program including a repeat block command in accordance with conventional art.
Figure 2:
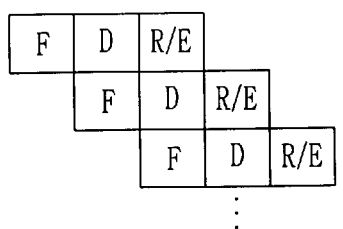
FIG. 2 illustrates a command pipe consisting of three steps of a fetch (F)—decode (D)—read/executing (R/E) in accordance with conventional art.
Figure 3:
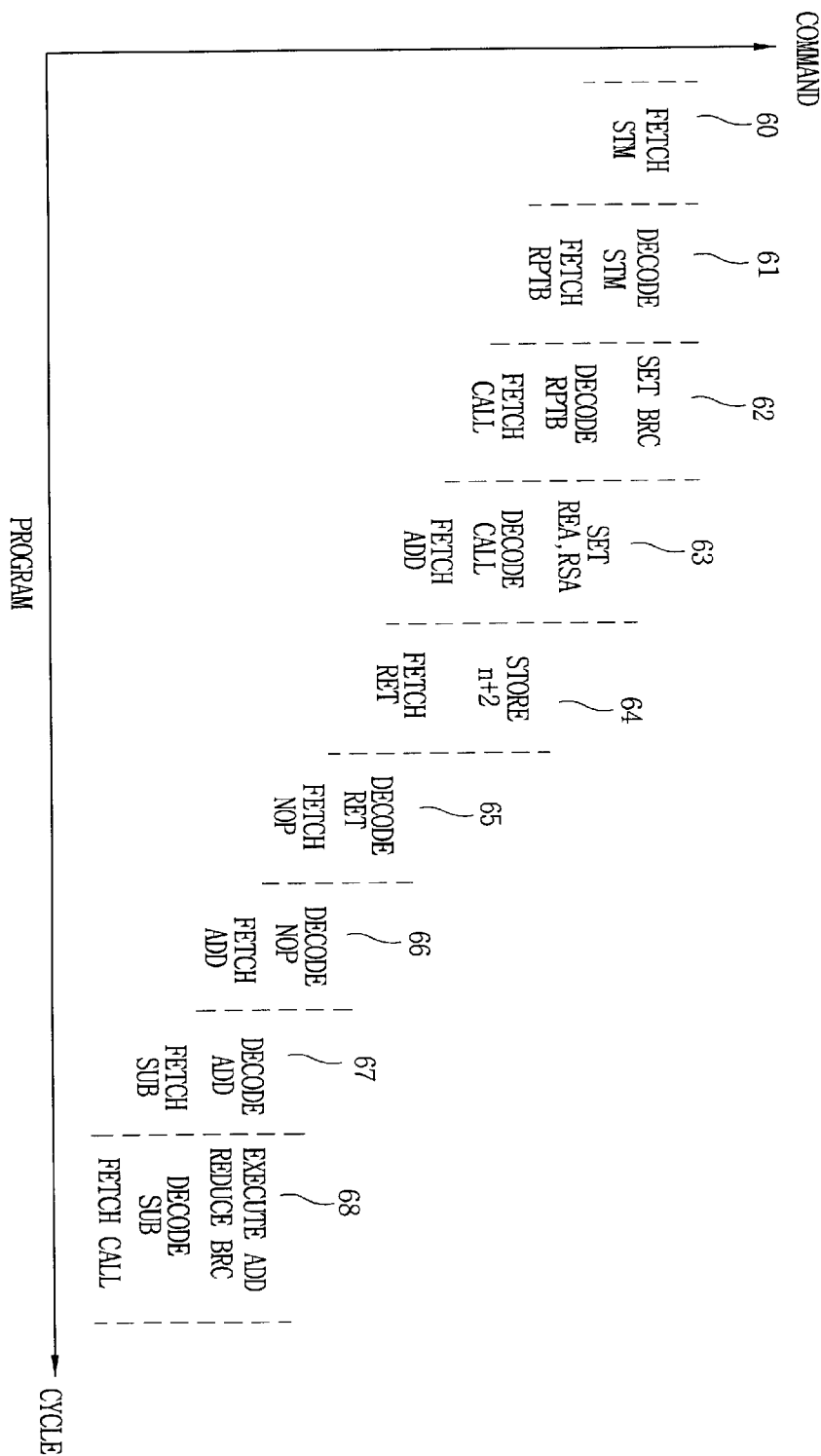
FIG. 3 illustrates an executing process of <Program 1> including the repeat block command of FIG. 1 in a three-step pipeline form in accordance with conventional art.
Figure 4:
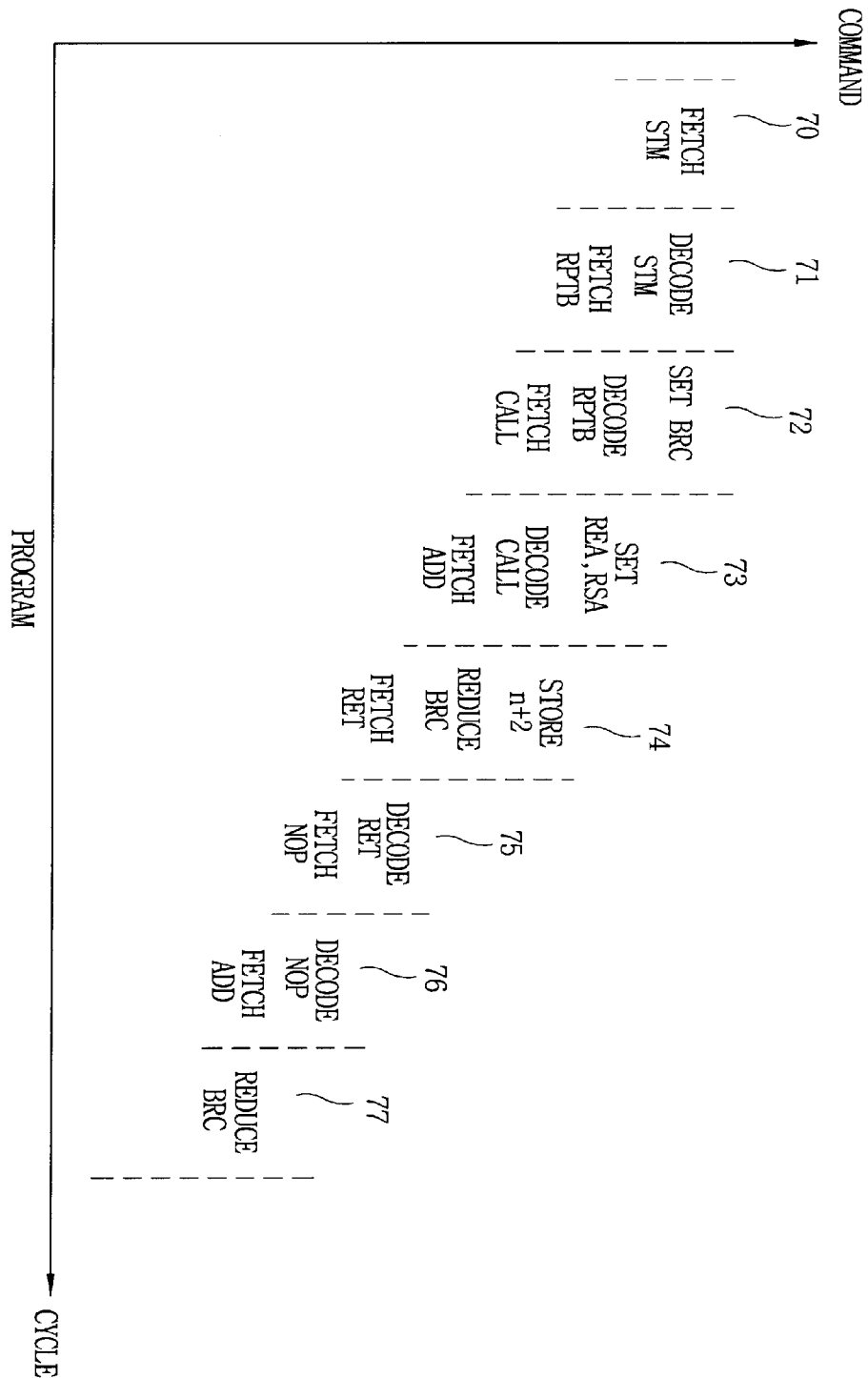
FIG. 4 illustrates an executing process of <Program 2> including the repeat block command of FIG. 1 in a three-step pipeline form in accordance with the conventional art.

The processor of the present invention includes RPTB correction logic 109 in addition to the conventional processor as shown in FIG. 1.

The RPTB correction logic 109 blocks the reduction signal inputting from the RPTB control logic 102 to the RC register 103 in case that the command being decoded at the processor core 100 is a command for nonlinearly (e.g. "BRANCH", "CALL", etc.) changing the executing order of the program.

The operation of the processing of data by the processor in accordance with the present invention, constructed as described above, will now be explained with reference to the malfunction part of <Program 2> as stated above.

In the fourth cycle, the RPTB control logic 102 sets the repeat ending address (REA) as (n+2) and the repeat starting address (RSA) as (n+1). The processor core 100 decodes the fetched command "CALL", and controls the memory 101 and the PC generation logic 106 so that the memory address (n+2) can be stored in the memory 101. And, the processor core 100 controls the PC generation logic 106 so that (n+10) will be set as the next PC value, and notifies the RPTB correction logic 109 that the command being currently decoded is "CALL". The "CALL" command is a command nonlinearly changing the executing order of the program. The next command following the "CALL" will not be decoded. Accordingly, the RPTB correction logic 109 judges that it is not the final part of the RPTB command yet, and thus, the RPTB correction logic 109 does not output the BRC reduction signal inputted from the RPTB control logic to the RC register 103. That is, as the RPTB correction logic 109 recognizes the command executed for generating the BRC reduction signal was "CALL", it blocks the reduction signal from being inputted to the RC register 103, by which the repeat count value BRC of the RC register 103 is not reduced. Also, the processor core 100 fetches the command "ADD" corresponding to the memory address (n+2) from the memory 101.

In the fifth cycle, the memory 101 stores the memory address (n+2). Since the previous command is "CALL", the processor core 100 does not decode (or execute) the next command "ADD". The repeat count value (BRC) is not reduced. And, the processor core 100 controls the PC generation logic 106 so that the PC value will be increased to (n+11), and fetches the command "RET" corresponding to the memory address (n+10).

When the program returns from the call, the repeat block will be executed the correct number of times. Therefore, in the present invention, a program can be properly executed even with only two commands within the repeat block and such a problem of the inaccurate reduction of the repeat count value (BRC) due to a non-linear change in the program, as in the conventional art, can be prevented.

In the present invention, the CALL" command is just a representative example for explanatory purposes. The present invention can be adapted to every command that nonlinearly changes the executing order of a program, without limitation to the example described above. In addition, the present invention can also be applied to the case of an interrupt, that is, a branch command having the highest priority.

As so far described, according to the method for processing data in a processor of the present invention, by resolving the restriction to the number of the commands of the repeat block, the reliability and efficiency of the application program including a repeat block can be highly improved. Also, the problem that the command "ADD" being counted as executed but not actually being executed is solved.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for processing data in a processor having a processor core for processing a command in a pipeline form,
    a program counter for storing a memory address of a command to be fetched, decoded and executed by the processor core;
    a program counter generation logic for increasing a program counter value and outputting it to the program counter; and
    a memory for storing a program including a repeat block, comprising the steps of:
    (i) setting a repeat count value;
    (ii) executing a repeat block command to set a repeat ending address and a repeat starting address, and decoding a first command of the repeat block and fetching a second command of the repeat block;
    (iii) comparing the repeat ending address and a memory address of the second command to identify whether they are identical to each other;
    (iv) checking whether the first command is a command for nonlinearly changing an executing order of a program only if the repeat ending address and the memory address of the second command are identical to each other.

2. The method according to claim 1, wherein the repeat count value is loaded by the processor core before the repeat block command is executed.

3. The method according to claim 1, wherein the fourth step includes a sub-step of providing the repeat starting address to the program counter to execute the repeat block again, if the memory address is identical to the repeat ending address and the first command is not a command for nonlinearly changing the executing order of the program.

4. The method according to claim 1, including a fifth step of storing the memory address of the second command and not reducing the repeat count value if the first command is a command for nonlinearly changing the executing order of the program.

5. The method according to claim 1, including a fifth step wherein the repeat count value is reduced without storing the memory address of the second command if the first command is not a command for nonlinearly changing the executing order of the program.

* * * * *